United States Patent [19]
Uozumi

[11] 3,745,813
[45] July 17, 1973

[54] ULTRASONIC INSPECTION ROLL SYSTEM
[75] Inventor: Sutekiyo Uozumi, Tokyo, Japan
[73] Assignee: Electronics Research Co. Ltd., Kanagawa Perfecture, Japan
[22] Filed: Apr. 7, 1971
[21] Appl. No.: 132,069

[30] Foreign Application Priority Data
Apr. 18, 1970 Japan.............................. 45/32763

[52] U.S. Cl.................................. 73/67.9, 73/71.5
[51] Int. Cl. ........................................ G01n 29/04
[58] Field of Search......................... 73/67.8, 67.8 S, 73/67.9, 71.5

[56] References Cited
UNITED STATES PATENTS
3,257,843   6/1966   Cowan.................................. 73/71.5

FOREIGN PATENTS OR APPLICATIONS
1,185,326   3/1970   Great Britain....................... 73/71.5
1,118,141   6/1968   Great Britain....................... 73/71.5
264,157     8/1968   Austria................................ 73/71.5

Primary Examiner—Richard C. Queisser
Assistant Examiner—John P. Beauchamp
Attorney—Spencer & Kaye

[57] ABSTRACT

In a roll system for ultrasonic inspection of steel plates or other materials using a double temperature gradient delay line, a predetermined safety zone is provided against possible wear of the delay line materials. The first delay line material in the roll assembly is so constructed as to serve as an acoustic beam lens through which inputs and outputs of transducers are switched at a high speed cycle.

4 Claims, 11 Drawing Figures

PATENTED JUL 17 1973 3,745,813

INVENTOR.
Sutekiyo Uozumi

BY Spencer & Kaye

ATTORNEYS.

PATENTED JUL 17 1973 3,745,813

INVENTOR.
Sutekiyo Uozumi

BY Spencer & Kaye

ATTORNEYS.

ULTRASONIC INSPECTION ROLL SYSTEM

BACKGROUND OF THE INVENTION

The present invention relates to a continuous ultrasonic inspection system used for hot steel plates or other materials, and more particularly, relates to the structural principles of an ultrasonic inspection roll assembly arranged to perform a continuous flaw detection by ultrasonic signals which are transmitted into and received from a material to be tested through a double temperature gradient delay line, and relates to the subject matter of copending patent application Ser. No. 870,374, filed on Sept. 25, 1969, now U.S. Pat. No. 3,625,051.

In the above-mentioned copending application, there was proposed a method for a continuous ultrasonic inspection of hot steel plates, in which a hollow cylindrical roll made of the same quality material as a material to be tested is used as both an acoustical coupling and a second temperature gradient delay line, and cooling oil is circulated through the hollow roll, and in which a solid pedestal mounted to the central, fixed shaft of the roll serve as both a first temperature gradient delay line and a lens which concentrates ultrasonic beams onto the surface of the test material. This method, however, has still involved some unsolved problems in the system arrangement for the purpose of allowing more realistic and more effective performance. Namely, the system proposed therein was subject to be inevitably worn in the area of the two delay lines as the roll of the second delay line is constantly rolled on the test material in contact therewith and the first delay line is mounted to the central, fixed shaft of the roll and to diminish in flaw detecting sensibility owing to possible positional shift of the roll contacting line with the test material which is being fed at a high speed, or possible pressure variation of the roll. Further, it was impossible to get the simple-arranged first delay line material to serve as an acoustic beam concentrating lens.

SUMMARY OF THE INVENTION

It is, therefore, an object of the present invention to provide a method for preclusion of a possible undeseirable effect produced by wear of two delay line materials used in an ultrasonic inspection roll system.

It is another object of the invention to provide for arranging a first delay line material mounted in a hollow inspection roll such as to constitute an ultra-sonic beam converging lens system.

It is an additional object of the invention to provide a method for preventing a decrease in detecting sensibility and S/N ratio which may be caused by the positional shift of a contact line of an inspection roll with a test material which can occur when there is high-speed (max. 120 m/min ) delivery of the test material, or by pressure variation of the roll.

These objects are achieved according to the present invention by providing a predetermined safety zone against wear of the double delay line materials in the ultrasonic inspection roll system. The first delay line material in the roll serves as a lens which concentrates the ultrasonic beams onto the surface of the material to be tested. The switching inputs and outputs of the multiple transducers are placed on the first delay line to scan the surface of the test material by ultrasonic beams at a high speed cycle.

DESCRIPTION OF THE PREFERED EMBODIMENTS

Figure 1:
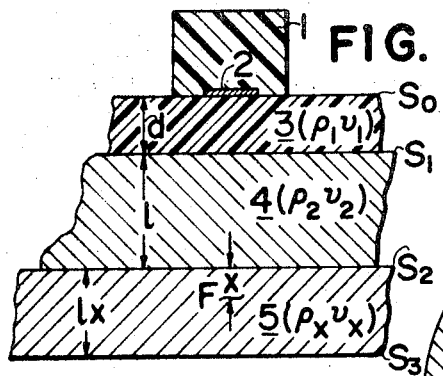
FIG. 1 is a cross-sectional view illustrating schematically the principle of a fundamental ultrasonic inspection system using a double delay line.
Figure 2:
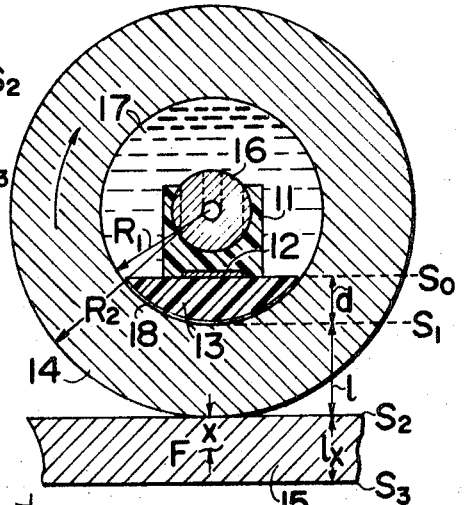
FIG. 2 is a cross-sectional view illustrating schematically an arrangement of an ultrasonic inspection roll assembly which has been adapted to incorporate the fundamental system in FIG. 1.
Figure 3:
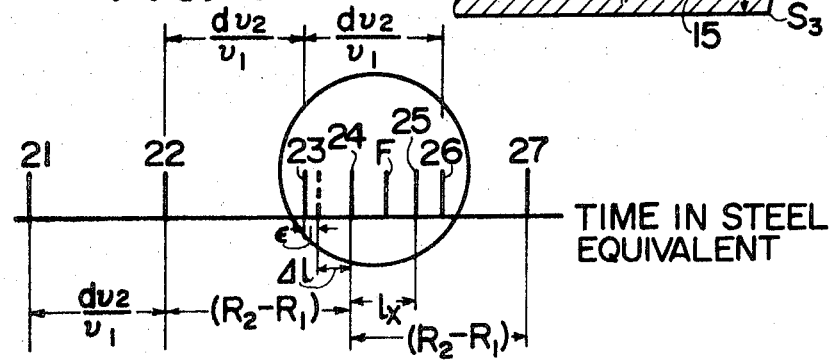
FIG. 3 is an illustration of echo timings obtained by the ultrasonic inspection roll system according to the invention.
Figure 4:
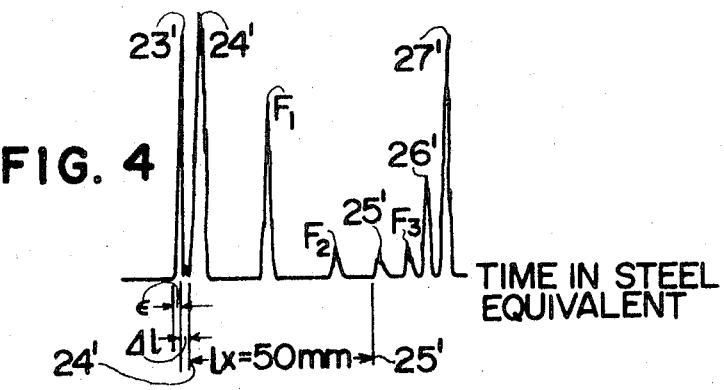
FIG. 4 is an illustration of typical echo patterns obtained by the ultrasonic inspection roll system according to the invention.
Figures 6A, 6B:
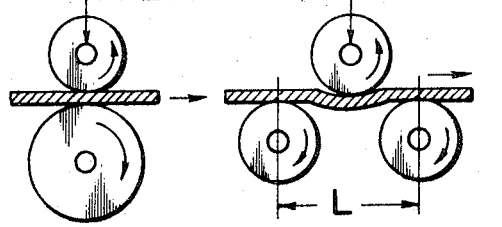
FIG. 6a is an schematic illustration of a system using a pinch roll.
FIG. 6b is an schematic illustration of a system using bending rolls.
Figure 7A:
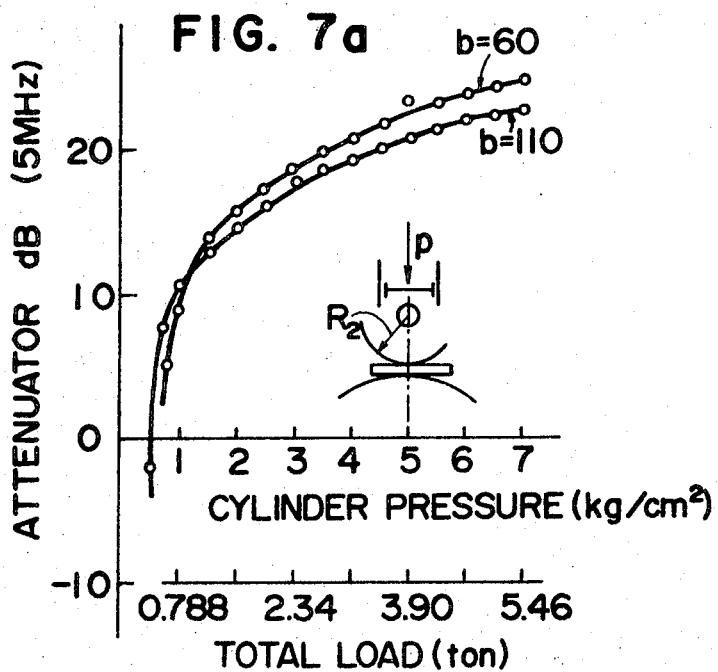
FIG. 7a is a graph showing back echo sensibility versus cylinder pressure in a pinch roll.
Figure 7B:
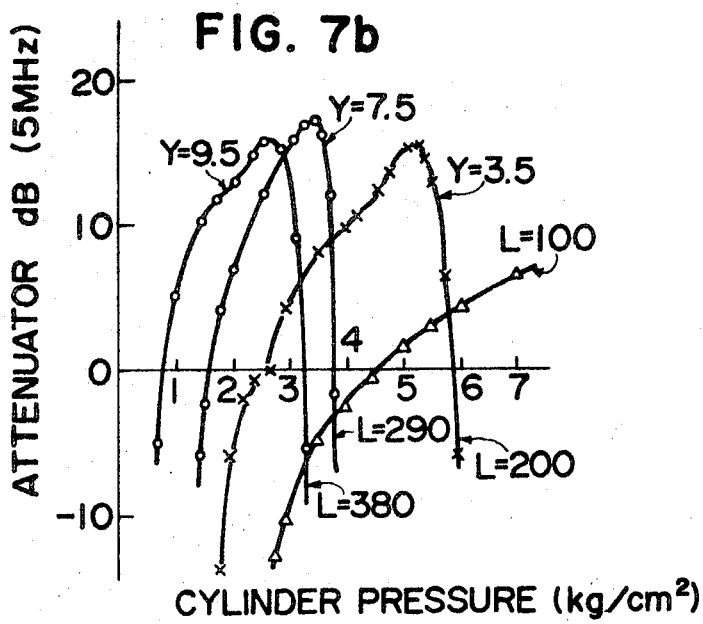
FIG. 7b is a graph showing back echo sensibility versus cylinder pressure in a bending roll system.

In FIG. 1–4, "F" is used to designate "flaw." FIG. 4 shows an example of typical echo patterns, of each surface of $S_1$-$S_3$ and F in FIG. 2 whose echo timings are shown in the circle in FIG. 3. FIG. 7a and FIG. 7b show graphs which were made in the case where test materials are S-45C steel plates, thickness of which is 14mm and roughness of their ultrasonic wave incidence surface was about 12S, under the condition that the graduation of the horizontal axis (Kg/cm$^2$) was the value of cylinder pressure and the graduation of the vertical axis (dB) was the value indicated at the attenuator in the case wherein frequency of 5 MHZ was used when the amplitude of the echo pattern on a cathode ray tube was a constant value of, for example, 50mm at normal temperature. The lower horizontal axis (ton) in FIG. 7a shows the value of the total load. In FIG. 7a, "b" is used to designate "the width of the test material (mm)," and in FIG. 7b, "L" designates "the interval between the fulcrums of the two table rollers(mm)" and "Y" designates "the downward displacement at the contact line of the test material (mm)."

Referring first to FIG. 1, there is shown a structural principle of a double delay line ultrasonic inspection system, including a damper block 1 and a transducer 2 placed within a face of the damper block. The transducer is arranged so as to transmit ultrasonic signals into and receive them from a material to be tested 5 through two temperature gradient delay line materials 3 and 4.

For obtaining acoustic impedance matching between the second delay line material 4 and the test material 5, the following relation must be satisfied as mentioned in the above-mentioned previous application:

$$\rho_2 \nu_2 \approx \rho_x \nu_x \quad (1)$$

where
"$\rho_2$" designates "the density of the second delay line 4,"
"$\rho_x$" designates "the density of the test material 5",
"$\nu_2$" designates "the sound velocity in the second delay line 4," and
"$\nu_x$" designates "the sound velocity in the test plate 5."

The formula (1) includes the case where the same quality material as the test material 5 is used for the second delay line material 4, that is, when the test material is steel the above condition is satisfied by using steel for the second delay line material. In this case, $$\rho_2 = \rho_x$$
$$\nu_2 = \nu_x$$

In order to preclude adverse effects which result from wear of the delay line materials, it is necessary to secure a predetermined safety zone against such wear. In FIG. 2, there is shown an arrangement wherein the fundamental system shown in FIG. 1 has been incorporated into a roll system allowing for a continuous inspection. The second delay line 14, which contacts the material to be tested 15, is shaped into the form of a hollow cylindrical roll arranged rotatable about its central axis, fixed shaft 16. Cooling fluid 17 is contained in or circulated through the hollow roll. The first delay line 13 including a transducer 12 is mounted on the central axis, fixed shaft 16, with an outer peripheral face thereof being in contact with the inner surface of the hollow roll.

In the embodiment of FIG. 2, "$d$" is used to designate "the thickness of the first delay line 13", "$l$" designates "the thickness of the second delay line 14", "$l_x$" designates "the thickness of the test material 15", "$\nu_1$" designates "the sound velocity in the first delay line", "$t_1$" designates "the ultrasonic wave propagation time in the first delay line", "$t_2$" designates "the ultrasonic wave propagation time in the second delay line", and "$t_x$" designates "the ultrasonic wave propagation time in the test material", and then $t_1$, $t_2$ and $t_x$ are respectively expressed:

$$t_1 = (2d/\nu_1)$$
$$t_2 = (2l/\nu_2)$$
$$t_x = (2lx/\nu_x)$$

then the following relation must be satisfied:

$$t_2 > t_1 > t_x \quad (2)$$

This numerical relation will be explained in conjunction with FIGS. 2 and 3.

In the case that the test material 15 is steel and the second delay line 14 is also made of steel in FIG. 2, if the following relation is provided between the thickness of the second delay line "$(R_2 - R_1)$" and the thickness of the first delay line "$d$:"

$$(R_2 - R_1) - (\Delta l + \epsilon)/\nu_2 = (d/\nu_1) \quad (3)$$

it is possible to obtain such echo timing as shown in FIG. 3. In the above mentioned formula (3), "$-\Delta l$" represents "the safety zone against the rotor wear" and "$\epsilon$" represents "the safety allowance" which is equivalent to the range of the 2nd $S_1$ echo, at least, for selection of the 1st $S_2$ echo necessary for the electronic system."

$$\Delta \alpha = \alpha - (l_x + \Delta l + °z\epsilon)(\nu_1/\nu_2) \quad (4)$$

In FIG. 3, the abscissa, that is, the time axis, is shown by the values calculated in steel equivalent, and where, respectively, 21 shows the $S_0$ pulse, 22 the 1st $S_1$ echo timing, 23 the 2nd $S_1$ back echo timing, 24 the timing of the 1st $S_2$ back echo from the roll surface, 25 the timing of the 1st $S_3$ back echo from the bottom of the test material, 26 the 3rd $S_1$ back echo timing, 27 the 2nd $S_2$ back echo timing, $F_2$ and $F_3$ (FIG. 4) the flaw back echo timing.

FIG. 4 shows an example of the echo pattern which is obtained by a trial apparatus of the invention. In FIG. 4 the relationship with the echo timing shown in FIG. 3 will be understood therefrom.

Figure 5:
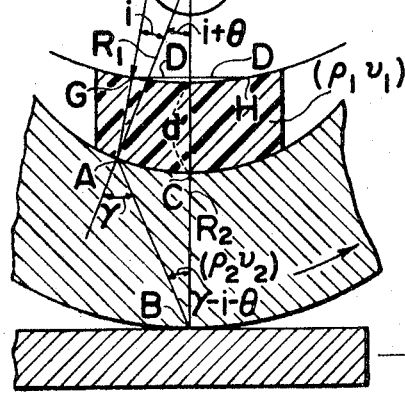
FIG. 5 is a schematic illustration of an ultrasonic beam converging lens system by the double delay line of the invention.

Now for the acoustic beam converging lens system by a double delay line, which is another important point of the invention, in FIG. 5, respectively, GH stands for a transducer, $R_0$ for the radius of curvature $\overline{O'G}$ of the transducer, $R_1$ for a roll bore radius $\overline{OA}$, $R_2$ for the radius of roll outer periphery $\overline{OB}$, $R_2-R_1$ for the roll thickness $\overline{CB}$, and GH is 2D. The following relation is given in determination of the conditions for convergence of ultrasonic beams with respect to FIG. 5:

$$\frac{R_0 - R_1 + d}{R_1} > \frac{1}{\sqrt{\frac{1}{n^2} - \frac{2}{n}\sqrt{1-N^2} + 1}} \quad (5)$$

where $N = D/R_0$ and $n = \nu_1/\nu_2$ (6)

Further, from these formulae, it is derived that beam convergence is possible, if the following conditions are given, even when the radius of curvature of the transducer $R_0$ is infinite, that is, a plane transducer is used:

$$(R_1/R_2)^2 < 1 - n^2 \quad (7)$$

$$R_1 > (1/n - 1)(R_2 - R_1) \quad (8)$$

These make it possible to make out a design which gives the function of an acoustic beam concentrating lens to the ultrasonic inspection roll assembly, which is able to obtain an excellent transmitting and receiving sensibility and a preferred S/N ratio of ultrasonic signals as shown in FIG. 4, converging acoustic beams on the contact line of a small area between the test material and the roll.

Now, an explanation will be presented of some other points of the invention which are related to the practical system of the ultrasonic inspection roll assembly. In a continuous ultrasonic inspection, the material to be tested is generally advanced by putting on a so-called table roller and the ultrasonic roll are in pressure contact with the test material. The table roller system may be divided, in view of a dynamics, into (a) pinch roll system and (b) bending roll system. When the contact pressure between the ultrasonic inspection roll and the test material is relatively small, or the thickness of the test material is relatively large and then the test material can hardly be bent by the contact pressure used, there is no significant difference in practical characteristic between the two different roll systems (a) and (b). However, when the thickness of the test material is relatively small, there is a significant difference between the two systems. In the ultrasonic inspection utilizing a so-called dry coupling wherein no liquid acoustical coupling is used for the contact section, a sizable difference in the pressure required for acoustical coupling is made between the two systems. Such relationship is graphically exemplified in FIG. 7a and FIG. 7b, wherein sensitivities versus pressures by the pinch roll system and the bending roll system are respectively shown.

Which system should be selected out of the two table rollers depends on the purpose for applying the ultrasonic inspection roll assembly, the conditions of the material to be tested, or the other factors. Namely, in case of conducting on-line inspection of a test material having a relatively small thickness at a high temperature ranging up to more than several hundred degrees centigrade by use of the bending type roll system, it is found to be impossible to sufficiently raise the contact pressure as in the case of a test material of a larger thickness, even if a fairly large press displacement "Y" of the test material is given at the center of the two table rollers' fulcrums. Furthermore, a high speed delivery which reach to 120 m/min at its maximum invites enlarged positional shifts of the contact line between the inspection roll and the surface of the test material and increased pressure variation, resulting in reduced stability of the ultrasonic inspection sensitivity. Thus, the above-mentioned ultrasonic beam concentration system is rather disadvantageous in this respect, but for this reason, if ultrasonic beams are simply so arranged as to have a broad spectrum, both condition of a sensitivity and a S/N ratio will become worse.

Figure 8A:
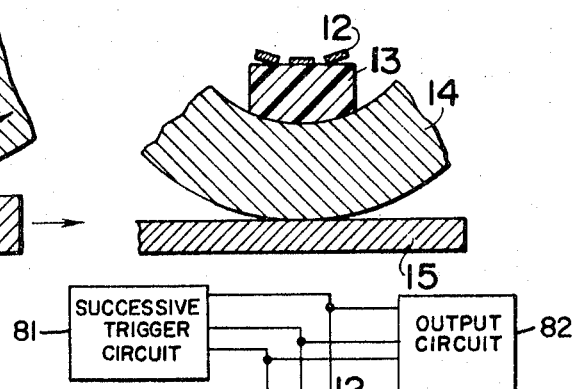
FIG. 8a is a cross-sectional view illustrating schematically an example of transducers position in an electronic switch scan system of the invention.
Figure 8B:
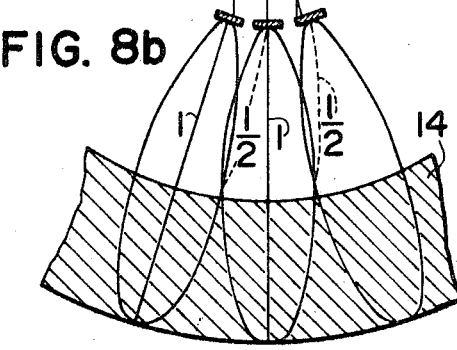
FIG. 8b is a schematic illustration of directivities of ultrasonic signals from the transducers shown in FIG. 8a onto the surface of the inspection roll.

In the invention, this contradiction was overcome by employing an ultrasonic beam scan system using electronic switching as described below. In this system the transducers numbering $m$ for each channel are mounted as shown in FIG. 8a, to the first delay line 13 which is inscribed to the roll bore surface as on concentric circle with respect to the roll center. Hence, the transducers are arranged as shown in FIG. 8b to have the spectrum of their ultrasonic beams on the roll surface orientated such that ultrasonic beams from the adjoining transducers cross each other at the $-3dB$ position. Of course, the abovementioned ultrasonic beam converging system should be established for each transducer. According to this arrangement, assuming that the $-3dB$ receiving area taken by each transducer is $a$ in circumferential length on the roll surface, the range of $m \times a$, in total, can be received in the $-3dB$ level.

Then, outputs or inputs of these transducers are electronically switched successively by successive trigger circuit 81 with a high-speed period "$Tr$"/$m$ synchronized with the repetition period "$Tr$" of the electronic system for the ultrasonic inspection, and the outputs after switching are connected in parallel to the output circuit 82 to be provided as an output for the channel.

It is possible, by means of this manner, to realize effective ultrasonic beam scanning in the neighborhood of the contact line of the ultrasonic inspection roll and to maintain the ultrasonic inspection roll performance of high sensitivity and high S/N ratio by covering undesirable effects caused by variation of the contact position and the pressure of the roll.

As will now be apparent from the foregoing explanation, the ultrasonic inspection roll system utilizing the invention is able to realize an on-line continuous ultrasonic inspection which works without decreasing the line speed which reaches 120m/min at its maximum in hot and/or cold plate mills. It is also possible, according to the system, to realize a continuous inspection of hot slabs on line, which detect a high concentrated segregation such as formed near the central portion of the ends of a slab or a billet and provide control signals where to cut off. Further, it is possible to realize a continuous measurement of a shell thickness of a so-called "strand" (bandlike steel material), above all that formed at the zone following the mould in a continuous casting system.

What is claimed is:

1. In a roll system for ultrasonic inspection of flaws of materials wherein ultrasonic signals are transmitted into and received from a material to be tested through a double temperature gradient delay line composed of a first delay line and a second delay line, the second delay line has the form of a hollow cylindrical roll with an axial, fixed shaft, enclosing a liquid for cooling and acoustical coupling through the hollow roll, and the first delay line including at least one transducer which is connected to the axial, fixed shaft of the roll, and the outer face of the first delay line contacts the inner face of the hollow roll, the improvement wherein said second delay line is composed of an acoustic impedance material analoguous to and of the same quality as the test material, and the said two delay lines have a relationship between them and the test material such that $t_2 > t_1 > t_x$, so as to provide a predetermined safety zone against wear of both the delay line materials, wherein $t_1$ is the ultrasonic propagation time in the first delay line, $t_2$ is the ultrasonic propagation time in the second delay line and $t_x$ is the ultrasonic propagation time in the test material.

2. The ultrasonic inspection roll system of claim 1, wherein said delay lines are made according to the following relationship to form a ultrasonic beam converging lens system:

$$(R_0 - R_1 + d)/(R_1) > (1)/(1/n^2 - 2/n \sqrt{1-N^2+1})$$

$$(n \equiv D/R_0, n \equiv v_1/v_2)$$

where $R_0$ is the radius of curvature of the transducer, $R_1$ is the radius of the roll bore, $2D$ is width of the transducer, $d$ is the first delay line thickness, $v_1$ is the sound velocity in the first delay line, and $v_2$ is the sound velocity in the second delay line.

3. The ultrasonic inspection roll system of claim 1, wherein said delay lines are made according to the following relationship to form an ultrasonic beam converging lens system, said transducer being a plane transducer:

$(R_1/R_2)^2 < 1 - n^2$ and $R_1 > (1/n - 1)(R_2 - R_1)$ $n = v_1/v_2$ where $R_1$ is the radius of the roll, $R_2$ is the radius of the outer circumference of the roll, $v_1$ is the sound velocity in the first delay line and $v_2$ is the sound velocity in the second delay line.

4. The ultrasonic inspection roll system of claim 2 wherein said ultrasonic beam scanning system includes m transducers mounted to said first delay line on a concentric circle facing the roll center, so that the spectrum of the respective ultrasonic beams on the roll surface are such that the beams of adjoining transducers cross each other at the -3dB position, and said transducers are connected to be successively switched for scanning the area near the roll contacting line with the test material so as to cover effects caused by a possible positional shift of the roll contacting line.

* * * * *

UNITED STATES PATENT OFFICE
CERTIFICATE OF CORRECTION

Patent No. 3,745,813                    Dated July 17th, 1973

Inventor(s) Sutekiyo Uozumi

It is certified that error appears in the above-identified patent and that said Letters Patent are hereby corrected as shown below:

In the heading of the patent, line 4, change "Perfecture" to --Prefecture--. Column 1, line 49, change "ultra-sonic" to --ultrasonic--. Column 3, line 3, change "$p_2v_2 \approx p_xv_x$" to --$p_2v_2 = p_xv_x$--;
after line 50, the equations should appear as follows:

$$t_1 \equiv (2d/v_1)$$
$$t_2 \equiv (2\ell/v_2)$$
$$t_x \equiv (2\ell x/v_x);$$

line 68, change "d:" to --"d":--. Column 4, after line 11, the equation should appear as follows:

$$\Delta d = d - (\ell_x + \Delta \ell + 2\varepsilon)(v_1/v_2).$$

Column 5, line 3, after "ultrasonic" insert --inspection--; line 58, change "abovementioned" to --above-mentioned--. Column 6, line 53, after "form" change "a" to --an--; after line 55, the formula should appear as follows:

$$\frac{R_0 - R_1 + d}{R_1} > \frac{1}{\frac{1}{n^2} - \frac{2}{n}\sqrt{1-N^2} + 1}$$

$$(N \equiv \frac{D}{R_0}, \quad n \equiv \frac{v_1}{v_2});$$

Signed and sealed this 19th day of March 1974.

(SEAL)
Attest:

EDWARD M. FLETCHER, JR.            C. MARSHALL DANN
Attesting Officer                  Commissioner of Patents